United States Patent
Choi

(10) Patent No.: US 9,573,455 B2
(45) Date of Patent: Feb. 21, 2017

(54) TRANSMISSION FOR HYBRID VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/805,117

(22) Filed: Jul. 21, 2015

(65) Prior Publication Data

US 2016/0129776 A1    May 12, 2016

(30) Foreign Application Priority Data

Nov. 12, 2014  (KR) .................. 10-2014-0157369

(51) Int. Cl.
| | |
|---|---|
| *B60K 6/365* | (2007.10) |
| *F16H 3/00* | (2006.01) |
| *B60K 6/48* | (2007.10) |
| *B60K 6/36* | (2007.10) |
| *B60K 6/547* | (2007.10) |
| *F16H 3/093* | (2006.01) |

(52) U.S. Cl.
CPC .............. *B60K 6/365* (2013.01); *B60K 6/36* (2013.01); *B60K 6/48* (2013.01); *B60K 6/547* (2013.01); *F16H 3/006* (2013.01); *B60K 2006/4808* (2013.01); *B60K 2006/4816* (2013.01); *F16H 2003/0931* (2013.01); *F16H 2200/0056* (2013.01); *Y10S 903/91* (2013.01)

(58) Field of Classification Search
CPC ........ F16H 3/006; F16H 37/042; B60K 6/365; B60K 6/445; B60K 6/48; B60K 2006/4808
See application file for complete search history.

(56) References Cited

U.S. PATENT DOCUMENTS

| | | | |
|---|---|---|---|
| 5,730,676 A | 3/1998 | Schmidt | |
| 6,558,283 B1 | 5/2003 | Schnelle | |
| 8,166,842 B2 | 5/2012 | Rieger | |
| 2008/0300744 A1* | 12/2008 | Katsuta | ................ B60W 10/08 701/22 |
| 2012/0021861 A1 | 1/2012 | Sakai et al. | |
| 2012/0258830 A1 | 10/2012 | Yoon et al. | |
| 2013/0337972 A1* | 12/2013 | Lee | ................ B60W 20/40 477/5 |

FOREIGN PATENT DOCUMENTS

| | | |
|---|---|---|
| JP | 2008-069832 A | 3/2008 |
| JP | 2009-001234 A | 1/2009 |
| KR | 10-2009-0021575 A | 3/2009 |
| KR | 10-2011-0112440 A | 10/2011 |
| KR | 10-1123474 B1 | 3/2012 |
| KR | 10-2012-0111812 A | 10/2012 |
| KR | 10-1334508 B1 | 11/2013 |

* cited by examiner

Primary Examiner — Huan Le
(74) Attorney, Agent, or Firm — Morgan, Lewis & Bockius LLP

(57) ABSTRACT

A transmission for a hybrid vehicle may include an input shaft receiving power from an engine, a motor configured to receive power from a battery so as to generate the power received from the battery by regeneration, an output shaft receiving the power from the input shaft and the motor, and a planetary gear apparatus connecting the power received by the input shaft from the engine to the output shaft.

13 Claims, 2 Drawing Sheets

TRANSMISSION FOR HYBRID VEHICLE

CROSS-REFERENCE TO RELATED APPLICATION

The present application claims priority to Korean Patent Application No. 10-2014-0157369, filed Nov. 12, 2014, the entire contents of which is incorporated herein for all purposes by this reference.

BACKGROUND OF THE INVENTION

Field of the Invention

The present invention relates to a transmission for a hybrid vehicle, and more particularly, to a transmission for a hybrid vehicle capable of connecting a planetary gear to a motor by disposing the planetary gear within the transmission.

Description of Related Art

In general, a hybrid vehicle is a vehicle in which an engine using oil fuel and a motor using a battery as a power source are mounted together to increase fuel efficiency and decrease exhaust gas, thereby protecting an environment.

The hybrid vehicle according to the related art includes the engine generating power, a transmission in which the motor, an engine clutch, a differential gear, and the like are embedded to perform a shift, and wheels connected to the transmission.

The engine clutch is fastened to or released from the engine. In this case, the engine is connected to a hybrid starter and generator (hereinafter, referred to as HSG (H')) by a belt, so as to be re-operated by the HSG at the time of a hybrid electric vehicle (HEV) mode.

The motor is embedded in the transmission, so as to assist power of the engine at the time of driving of the vehicle and serve to charge the battery at the time of a regenerative breaking. In this case, one side of the motor is connected to the engine clutch on the same shaft as a driving shaft of the engine and the other side thereof is connected to a mechanical oil pump.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to maximally suppressing an increase of a whole length when a motor is added to DCT and to reduce costs of a transmission and lighten the transmission by removing a counter shaft of a reverse stage.

According to various aspects of the present invention, a transmission for a hybrid vehicle may include an input shaft receiving power from an engine, a motor configured to receive power from a battery so as to generate the power received from the battery by regeneration, an output shaft receiving the power from the input shaft and the motor, and a planetary gear apparatus connecting the power received by the input shaft from the engine to the output shaft.

The planetary gear apparatus may include a sun gear connected to the input shaft of the transmission.

The input shaft may include a first input shaft transferring the power from the engine to even-numbered gears, and a second input shaft transferring the power from the engine to odd-numbered gears, in which the sun gear is connected to the first input shaft.

The planetary gear apparatus may include a planetary gear engaged with the sun gear, and a carrier rotatably fixing the planetary gear and fixed to a case of the transmission.

The planetary gear apparatus may include a ring gear connected to a rotor of the motor.

The ring gear may be connected to a reverse stage input gear.

The reverse stage input gear may have a hollow shaft formed so as to be rotated regardless of rotation of the input shaft.

The transmission may further include a reverse stage output gear configured to be connected to the reverse stage input gear.

The transmission may further include a dog clutch configured to selectively connect the reverse stage output gear and the output shaft.

According to various aspects of the present invention, a transmission for a hybrid vehicle may include an input shaft receiving power from an engine, a motor configured to receive power from a battery so as to generate the power received from the battery by regeneration, an output shaft receiving the power from the input shaft and the motor, and a planetary gear apparatus rotating the output shaft in a direction which is opposite to a rotation direction of the input shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
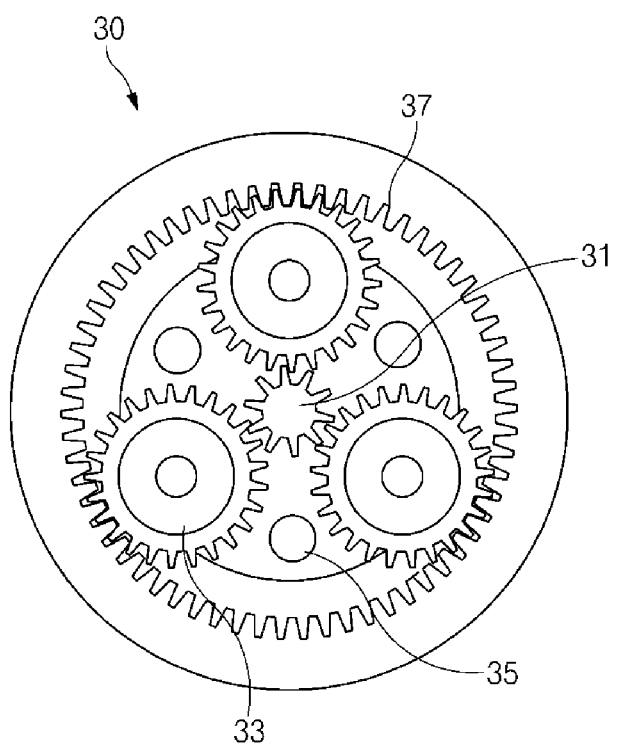
FIG. 1 is a plan view of a planetary gear apparatus.
Figure 2:
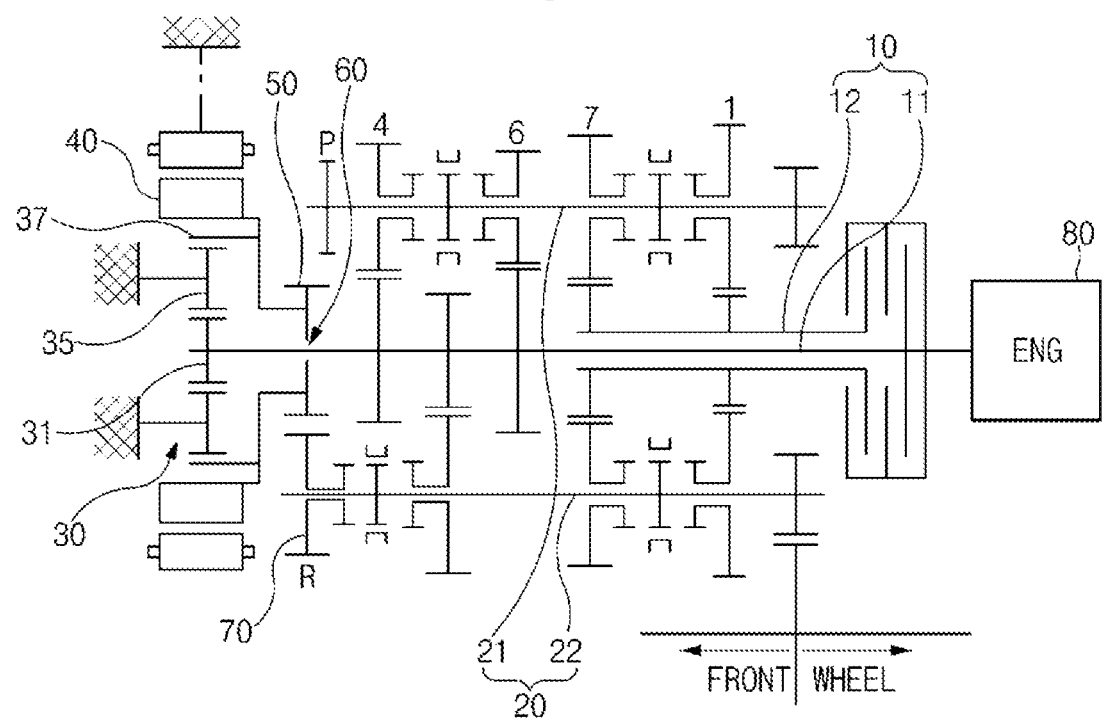
FIG. 2 is a configuration diagram of an exemplary transmission for a hybrid vehicle according to the present invention.

FIG. 1 is a plan view of a planetary gear apparatus 30. FIG. 2 is a configuration diagram of a transmission for a hybrid vehicle according to various embodiments of the present invention.

Referring to FIG. 1 and FIG. 2, the transmission for the hybrid vehicle according to various embodiments of the present invention includes an input shaft 10 receiving power from an engine 80, a motor 40 receiving the power from a battery so as to generate the power and generating the power by regeneration, an output shaft 20 receiving the power from the input shaft 10 and the motor 40, and a planetary gear apparatus 30 connecting the power applied to the input shaft 10 to the output shaft 20. The planetary gear apparatus 30 includes a sun gear connected to the input shaft 10 of the transmission.

The input shaft 10 includes a first input shaft 11 transferring the power to even-numbered gears and a second input shaft 12 transferring the power to odd-numbered gears, and the sun gear is connected to the first input shaft 11. The output shaft 20 is provided in plural and includes a first output shaft 21 and a second output shaft 22.

The planetary gear apparatus 30 includes a planetary gear 33 engaged with a sun gear 31 and a carrier 35 rotatably fixing the planetary gear 33 and fixed to a case of the transmission 45. The planetary gear apparatus 30 includes a ring gear 37 connected to a rotor of the motor 40.

The ring gear 37 is connected to a reverse stage input gear 50. The reverse stage input gear 50 has a hollow shaft 60 formed so as to be rotated regardless of the input shaft 10.

The transmission for the hybrid vehicle according to various embodiments of the present invention further includes a reverse stage output gear 70 connected to the reverse stage input gear 50.

The transmission for the hybrid vehicle according to various embodiments of the present invention further includes a dog clutch 85 selectively connecting the reverse stage output gear 70 and the output shaft 20.

The planetary gear apparatus 30 is connected to the motor 40. The sun gear 31 of the planetary gear apparatus 30 is connected to the input shaft 10, and the input shaft 10 includes the first input shaft 11 supplying power to odd-numbered gears (first stage, third stage, fifth stage, and seventh stage) and the second input shaft 12 supplying power to even-numbered gears (second stage, fourth stage, sixth stage, and reverse stage). Here, the sun gear 31 is connected to the first input shaft 11.

The carrier 35 is fixed to the case of the transmission 45. The ring gear 37 is connected to the rotor of the motor 40 and the reverse stage input gear 50.

The reverse stage input gear 50 is rotated by the hollow shaft 60 regardless of the input shaft 10 of the transmission. The reverse stage input gear 50 is connected the reverse stage output gear 70 by the gear. The reverse stage output gear 70 is selectively connected to the output shaft 20 by the dog clutch 85.

The transmission for the hybrid vehicle according to various embodiments of the present invention includes an input shaft 10 receiving power from an engine 80, a motor 40 receiving the power from a battery so as to generate the power and generating the power by regeneration, an output shaft 20 receiving the power from the input shaft 10 and the motor 40, and a planetary gear apparatus 30 rotating the output shaft 20 in a direction which is opposite to a rotation direction of the input shaft 10.

Since the power of the engine 80 is transferred to the output shaft 20 through the planetary gear 33 and the rotation direction is changed by the structure as described above, the reverse is implemented. Since the motor 40 is connected to the input shaft 10 of the transmission through the planetary gear 33, it is operated in the same way as an existing double clutch hybrid. Therefore, a counter shaft of the reverse stage may be removed while the motor 40 is connected to the input shaft 10 of the transmission, without additionally increasing the whole length except for the motor 40.

Since a structure according to the related art in which the motor 40 and the input shaft 10 of the transmission are directly connected to each other has the same revolutions per minute (RPM) of the motor 40 and the engine 80, it is not matched to characteristics of the motor 40 that advantageously uses RPM higher than the engine 80. However, according to the present structure, since the motor 40 is connected to the input shaft 10 through a planetary gear 33 ratio, RPM of the motor 40 may be increased as compared to the engine 80 and torque of the motor 40 may be increased, thereby improving performance in a situation such as a start, or the like. In addition, the transmission having minimized change parts from an existing transmission may be mounted in the HEV.

As described above, according to various embodiments of the present invention, the following advantages may be obtained.

First, by connecting the motor to the input shaft of the transmission, the counter shaft of the reverse gear stage may be removed without increasing the length.

Second, since the motor is connected to the input shaft of the transmission while having the planetary gear ratio, the motor torque may be increased, thereby improving the EV start torque.

Third, the transmission having minimized change parts from an existing transmission may be mounted in the HEV.

However, effects of the present invention are not limited to the effects described above, and other effects that are not described above may be clearly understood by those skilled in the art from the claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid vehicle, the transmission comprising:
   an input shaft receiving power from an engine;
   an output shaft receiving a first power and a second power from the input shaft and a motor; and a planetary gear apparatus connecting the power received by the input shaft from the engine to the output shaft, wherein the planetary gear apparatus includes:
- a planetary gear engaged with a sun gear; and
- a carrier being fixed to a case of the transmission and rotatably fixing the planetary gear, and wherein a ring gear is connected to a reverse stage input gear, and wherein the reverse stage input gear has a hollow shaft formed so as to be rotated regardless of rotation of the input shaft.

2. The transmission according to claim 1, wherein the planetary gear apparatus includes the sun gear connected to the input shaft of the transmission.

3. The transmission according to claim 2, wherein the input shaft includes:
- a first input shaft transferring the power from the engine to even-numbered gears; and
- a second input shaft transferring the power from the engine to odd-numbered gears, wherein
the sun gear is connected to the first input shaft.

4. The transmission according to claim 1, wherein the planetary gear apparatus includes the ring gear connected to a rotor of the motor.

5. The transmission according to claim 1, further comprising a reverse stage output gear configured to be connected to the reverse stage input gear.

6. The transmission according to claim 5, further comprising a dog clutch configured to selectively connect the reverse stage output gear and the output shaft.

7. A transmission for a hybrid vehicle, the transmission comprising:
- an input shaft receiving power from an engine;
- an output shaft receiving a first power and a second power from the input shaft and a motor; and
- a planetary gear apparatus rotating the output shaft in a direction which is opposite to a rotation direction of the input shaft, wherein the planetary gear apparatus includes:
- a planetary gear engaged with a sun gear; and
- a carrier being fixed to a case of the transmission and rotatably fixing the planetary gear, wherein a ring gear is connected to a reverse stage input gear, and wherein the reverse stage input gear has a hollow shaft formed so as to be rotated regardless of rotation of the input shaft.

8. The transmission according to claim 7, wherein the planetary gear apparatus includes the sun gear connected to the input shaft of the transmission.

9. The transmission according to claim 8, wherein the input shaft includes:
- a first input shaft transferring the power from the engine to even-numbered gears; and
- a second input shaft transferring the power from the engine to odd-numbered gears, wherein
the sun gear is connected to the first input shaft.

10. The transmission according to claim 8, wherein the planetary gear apparatus includes a ring gear connected to a rotor of the motor.

11. The transmission according to claim 7, wherein the planetary gear apparatus includes the ring gear connected to a rotor of the motor.

12. The transmission according to claim 7, further comprising a reverse stage output gear configured to be connected to the reverse stage input gear.

13. The transmission according to claim 12, further comprising a dog clutch configured to selectively connect the reverse stage output gear and the output shaft.

* * * * *